US007086988B2

(12) United States Patent
Fett et al.

(10) Patent No.: US 7,086,988 B2
(45) Date of Patent: Aug. 8, 2006

(54) INTERACTIVE GEAR ENGAGEMENT

(75) Inventors: Dennis W Fett, Clinton Township, MI (US); Mark J Poublon, Shelby Township, MI (US); John M Rzepecki, II, Clinton Township, MI (US); Gary K Lowe, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 83 days.

(21) Appl. No.: 10/769,223

(22) Filed: Jan. 30, 2004

(65) Prior Publication Data

US 2005/0170930 A1 Aug. 4, 2005

(51) Int. Cl.
*B60W 10/04* (2006.01)
*F16H 59/64* (2006.01)

(52) U.S. Cl. .................. 477/109; 477/113; 477/98

(58) Field of Classification Search .......... 477/109–10, 477/112–3, 98, 100
See application file for complete search history.

(56) References Cited

U.S. PATENT DOCUMENTS

| 5,468,198 A | 11/1995 | Holbrook et al. | |
| 5,833,572 A * | 11/1998 | Leising et al. | 477/113 |
| 6,050,379 A | 4/2000 | Lyon | |
| 6,269,293 B1 | 7/2001 | Correa et al. | |
| 6,726,596 B1 * | 4/2004 | Kresse et al. | 477/109 |
| 2003/0047164 A1 * | 3/2003 | Jaye | 477/100 |
| 2003/0100401 A1 * | 5/2003 | Kim | 477/109 |

FOREIGN PATENT DOCUMENTS

| JP | 404362353 A | * 12/1992 |
| JP | 405044515 A | * 2/1993 |
| JP | 405280398 A | * 10/1993 |
| JP | 405280400 A | * 10/1993 |

* cited by examiner

*Primary Examiner*—Roger Pang
(74) *Attorney, Agent, or Firm*—Thomas A. Jurecko

(57) ABSTRACT

A vehicle powertrain has an engine coupled to an electronically-controlled automatic transmission. A method for controlling the vehicle powertrain during a transmission shift from a neutral gear to a drive gear detects a change in a signal indicative of a desired transmission gear change from a neutral gear to a drive gear. An engine idle speed is reduced by a predetermined RPM in response to the change in the signal. The transmission is shifted from the neutral gear into the drive gear upon the engine idle speed being reduced by the predetermined RPM.

8 Claims, 3 Drawing Sheets

INTERACTIVE GEAR ENGAGEMENT

FIELD OF THE INVENTION

This invention relates generally to controlling a vehicle powertrain, and, more particularly, to a system and method in which engine and transmission control segments communicate in order to control torque in the vehicle powertrain.

BACKGROUND

In motor vehicles it is desirable to control or reduce particular noises and vibrations created in the vehicle powertrain. One source of noise is caused by the collective lash between components in the vehicle driveline. As the vehicle is changed from a neutral gear to a drive gear, the transmission applies torque to the driveline which causes its components to move and take-up the collective lash. As the components move, the driveline emits a noise which is commonly referred to as driveline clunk. As engine RPM increases, as is often the case when an engine is idling after a cold start, the driveline clunk becomes increasingly annoying. However, the increased engine RPM is desirable to increase the heating of an exhaust catalyst connected to the engine.

SUMMARY OF THE INVENTION

Accordingly, one aspect of the present invention is to provide a system and method for providing an elevated cold engine idle speed while also minimizing driveline clunk.

In accordance with these aspects, a vehicle powertrain is provided having an engine coupled to an electronically-controlled automatic transmission. A method for controlling the vehicle powertrain during a transmission shift from a neutral gear to a drive gear detects a change in a signal indicative of a desired transmission gear change from a neutral gear to a drive gear. An engine idle speed is reduced by a predetermined RPM in response to the change in the signal. The transmission is shifted from the neutral gear into the drive gear upon the engine idle speed being reduced by the predetermined RPM.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

DETAILED DESCRIPTION OF THE PREFERRED EMBODIMENT

Figure 1:
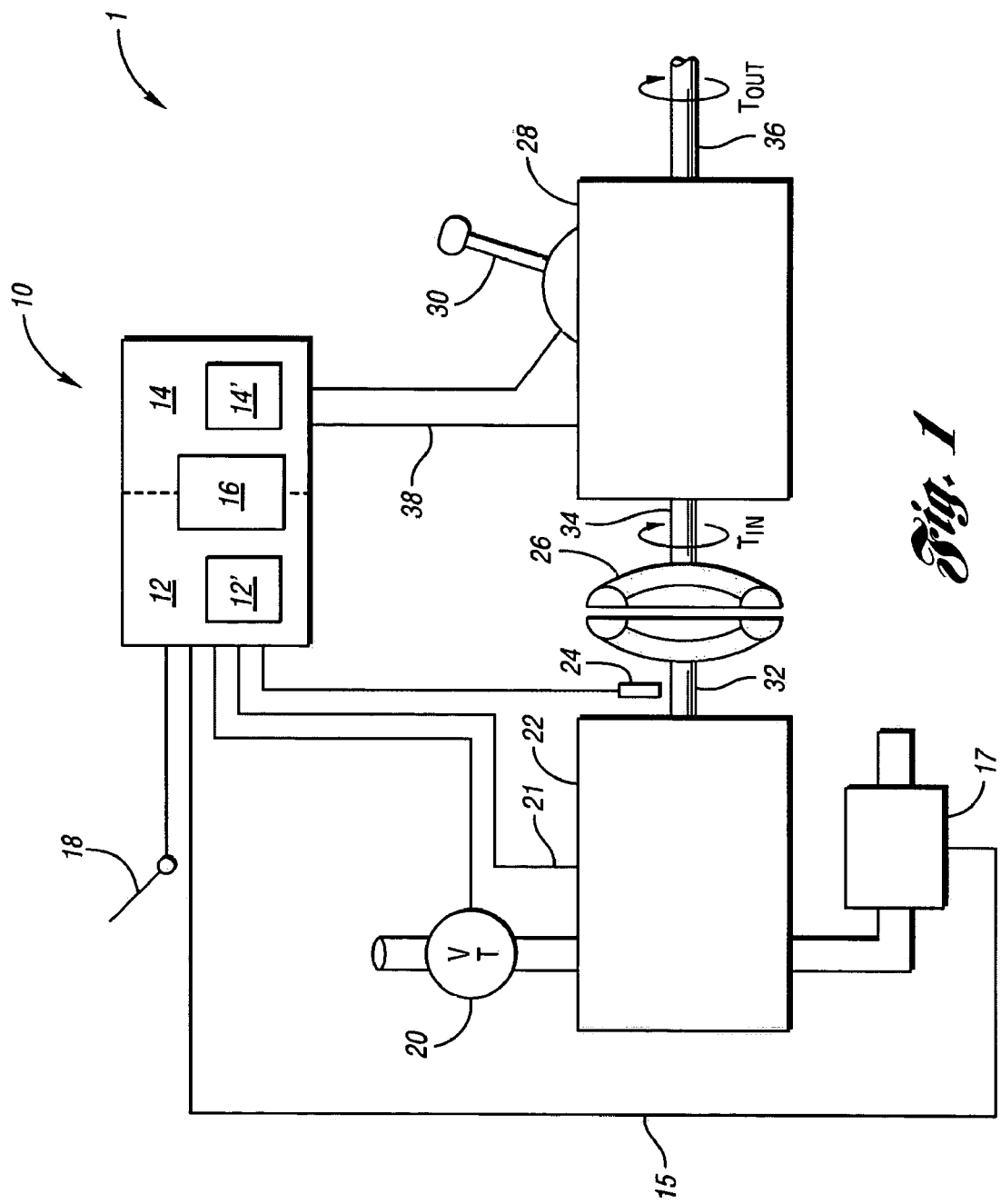
FIG. 1 is a block diagram of a powertrain control system.

Turning now to FIG. 1, a block diagram of a vehicle powertrain 1 is shown. An engine 22 has a crankshaft 32, which is connected to one side of a viscous coupling 26. The other side of the viscous coupling 26 provides input torque TIN to an input shaft 34 of electronically controlled transmission 28. The transmission 28 provides output torque $T_{OUT}$ at output shaft 36, which is connected to the driveshaft and axles (not shown) as is known in the art. Transmission 28 also has at least one gear engagement control input 38 for engaging a drive gear and a neutral gear in the transmission. Engine 22 has an idle air control valve 20 for providing combustion air to the engine 22. The idle air control valve 20 is controlled by a powertrain control module (PCM) 10. A spark angle control line 21 from the PCM 10 controls the ignition angle of engine 21. Exhaust gas from engine 22 is routed through a catalyst 17 to reduce undesirable exhaust emissions.

The PCM 10 has an engine segment 12 and a transmission segment 14. The two segments communicate via a communications block 16. In one aspect, each segment 12, 14 may have its own microprocessor, with the communications block 16 comprising a dual-port RAM or communication bus between the segments 12, 14. In another aspect, the segments 12, 14 may be physically separated controllers, with the communications block 16 comprising a network between them. In yet another aspect, PCM 10 may have a single microprocessor, with segments 12, 14 being implemented in software with the communications block 16 comprising memory locations.

Each segment 12, 14 executes instructions from its respective memory 12', 14'. The instructions provide operation in accordance with the method of the invention as described below. Engine segment 12 receives a throttle signal from throttle pedal position sensor 18 and also receives a crankshaft signal from a crankshaft sensor 24. A catalyst temperature signal 15 may be used to provide engine segment 12 with catalyst temperature data. Alternatively, the engine segment 12 may estimate the catalyst 17 temperature. Transmission segment 14 receives a drive/neutral (D/N) signal from a gear selector switch 30. Alternatively, the transmission segment 14 may receive the D/N signal as a message from a vehicle network arrangement. When the transmission 28 is in neutral, the output torque $T_{OUT}$ is approximately zero. Conversely, when the transmission 28 is in a drive gear, the output torque $T_{OUT}$ is a multiple of input torque $T_{IN}$.

Figure 2:
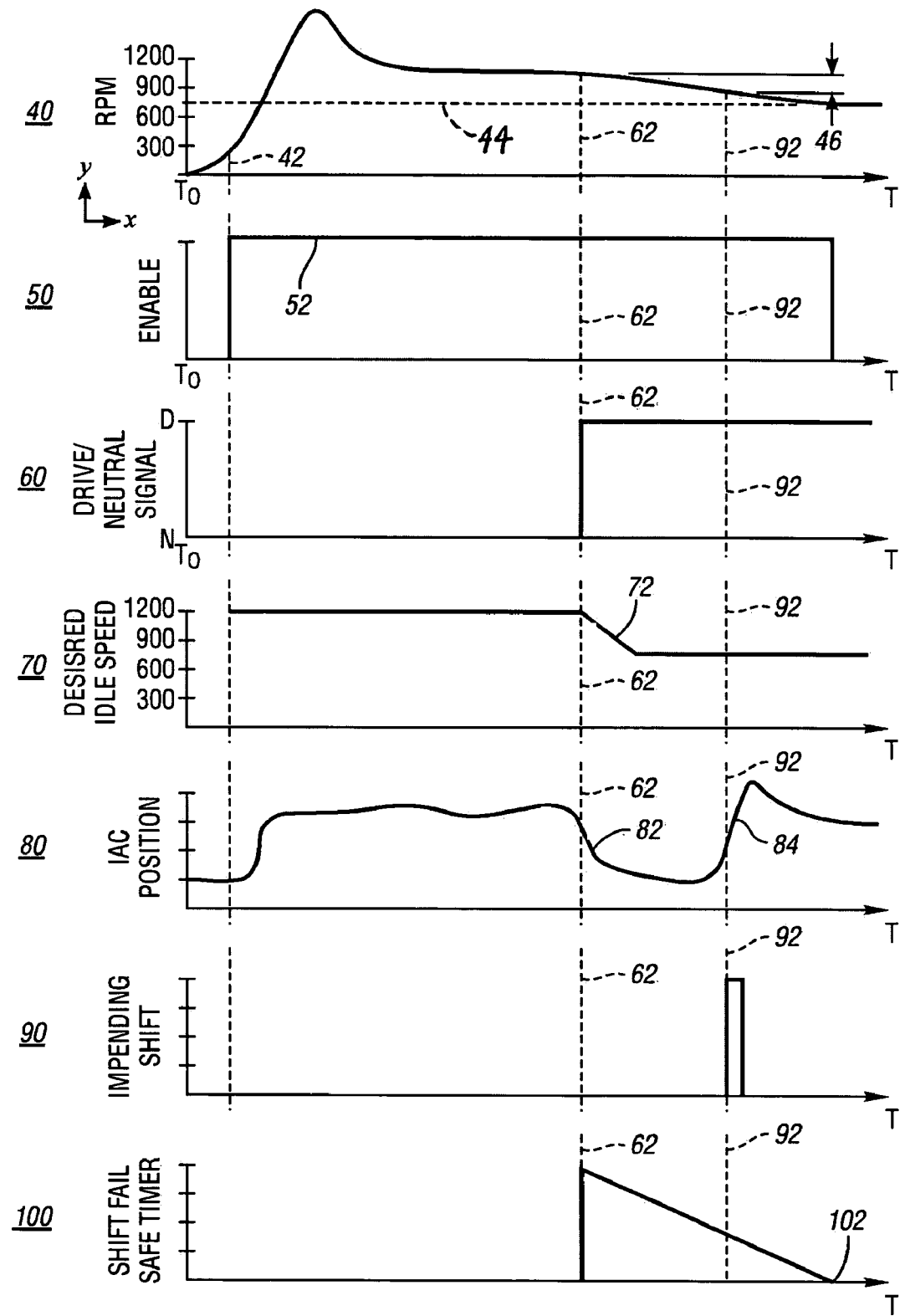
FIG. 2 is a timing diagram illustrating operation of the invention.

Turning to FIG. 2, operation of the invention is shown in a time-correlated format wherein the x-axis of each graph represents time. The y-axis of each graph represents the quantity stated in each graph's y-axis label. Graph 40 shows engine crankshaft 32 RPM during a typical cold engine start. The engine module 12 determines crankshaft RPM from the crankshaft sensor 24 as is known in the art. Beginning at time $T_0$, the engine RPM is zero and increases as the engine is started. A short time later, after the engine has fired, the engine RPM is sufficient to declare that a start-to-run transfer 42 has occurred and the engine is running. When the engine is started in a cold condition the engine module 12 sets the engine idle speed greater than a typical idle speed 44. This elevated idle speed is desirable to increase the rate of heat accumulation in the exhaust catalyst 17. However, the elevated idle speed is undesirable when shifting the transmission 28 from a neutral gear to a drive gear since it increases the likelihood of driveline clunk.

Graph 60 depicts a D/N signal. At time 62, the D/N signal indicates to the PCM 10 that the gear selector switch 30 has been changed from a neutral gear to a drive gear. In response to this indication, the engine control segment 12 reduces the desired idle speed as shown by sloped segment 72 in graph 70. Graph 80 represents motion of the idle air control valve 20. After time 62, the idle air control valve 20 begins closing to reduce the engine idle speed 82 in response to the desired idle speed reduction at sloped segment 72. Additionally, the engine segment 12 may retard the spark angle via spark angle control line 21 to reduce engine RPM. Reducing the spark angle to reduce engine RPM may provide a faster response than reducing engine RPM via the idle air control valve 20.

Once the engine RPM decreases by a predetermined RPM 46 from the RPM at time 62, the transmission control segment 14 sends a gear engagement signal to the transmission via gear engagement control 38. The predetermined RPM 46 may be dynamically adjusted depending on factors such as the engine coolant temperature, transmission oil temperature, ambient air temperature, catalyst temperature, or time since engine start 42. By decreasing the engine RPM by the predetermined RPM 46 as described, the transmission 28 may shift into a drive gear without generating an undesirable amount of driveline clunk.

The transmission 28 begins shifting into a drive gear upon receiving the gear engagement signal. After a shift delay period expires at time 92, the transmission control segment 14 may send an impending shift signal 90 to the engine control segment 12 via communication block 16. The shift delay period accounts for a time lag between the transmission receiving the gear engagement signal and the transmission beginning to shift into a drive gear. The impending shift signal indicates that the transmission gear engagement is imminent and the torque load on the engine will therefore increase. Upon receiving the impending shift signal 90, the engine control segment 12 increases the IAC position 84 to increase the engine output torque. Advancing the ignition timing of the engine may also be used to increase engine torque. The engine torque increase is resultantly coordinated with the transmission torque increase, thereby minimizing engine RPM transients during the gear engagement.

The operation described above may be further enhanced by providing an enable period 52. The enable period may be maintained by either the engine or transmission control segment and ensures the above-described operation sequence only activates during the period following a cold start of the engine. An enable period 52 is shown in graph 50. The enable period may further be a function of the catalyst temperature.

A fail-safe timer 100 may also be provided within the PCM 12. The fail-safe timer operates to allow the shift to occur within a predetermined time after the D/N signal is received at time 62 in the event the engine RPM does not decrease by a predetermined RPM 46. Upon expiration 102 of the fail-safe timer, the transmission control segment 14 will shift the transmission into gear regardless of whether the engine RPM has decreased by predetermined RPM 46.

Figure 3:
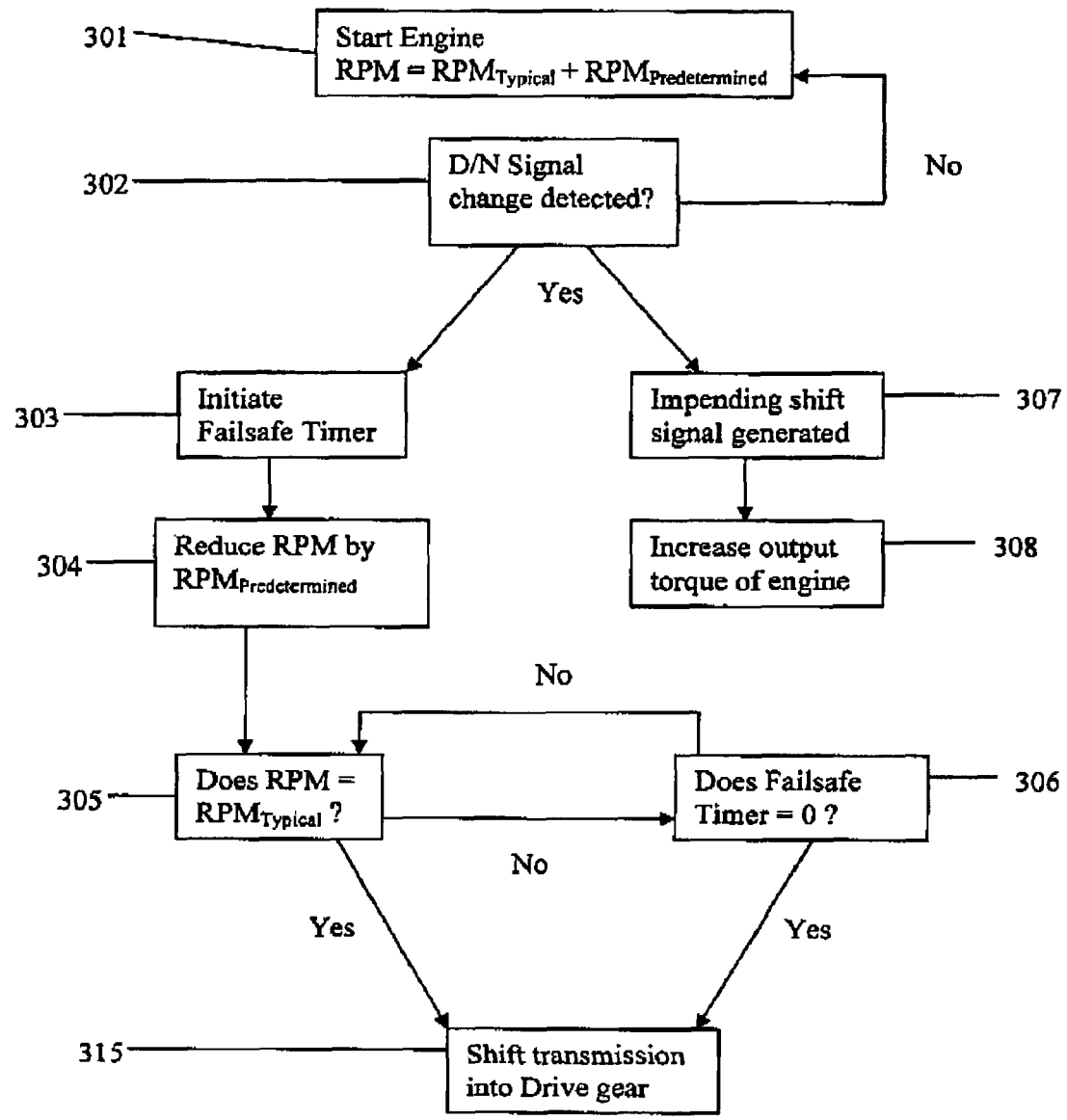
FIG. 3 is a flowchart illustrating operation of the invention according to an exemplary embodiment.

Referring to FIG. 3, a flowchart is provided to illustrate operation of the invention according to an exemplary embodiment. The engine is started, step 301, with the engine RPM being generally higher than a typical engine RPM. Once a D/N signal change is detected, step 302, the failsafe timer is initiated, step 303, and the engine RPM is instructed to be reduced, step 304, by a predetermined RPM. Additionally, upon detection, step 302, of a D/N signal change, an impending shift signal may be generated, step 307, to increase output torque, step 308, of the engine. Prior to shifting the transmission into the drive gear, engine RPM is compared, step 305, to determine whether it equals a typical engine RPM. If not, the failsafe timer is checked, step 306, to determine whether it has expired. These two operations are repeated until one or the other situations is satisfied, at which time the transmission is allowed to shift, step 315, into the drive gear.

Referring to FIGS. 1–3, according to an exemplary embodiment, step 301 corresponds generally to time 42. Step 302 generally corresponds to time 62; and step 307 generally corresponds to time 92. Failsafe timer of step 303 generally corresponds to failsafe timer 100; and condition 306 wherein the failsafe timer has expired generally corresponds to expiration 102 of failsafe timer 100. Steps 302–315 are generally performed by the PCM 10.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a vehicle powertrain comprising an engine coupled to an electronically-controlled automatic transmission, a method for controlling the vehicle powertrain during a transmission shift from a neutral gear to a drive gear, the method comprising:
   detecting a change in a signal indicative of a desired transmission gear change from a neutral gear to a drive gear;
   reducing an engine idle speed by a predetermined RPM in response to said change in said signal; and
   shifting the transmission from the neutral gear into the drive gear upon said engine idle speed being reduced by said predetermined RPM;
   wherein said predetermined RPM is determined by subtracting a typical idle speed from an increased idle speed, the increased idle speed necessary to increase a rate of heat accumulation in an exhaust catalyst when the engine is started in a cold condition.

2. The method of claim 1 further comprising generating an impending shift signal indicative of an imminent transmission shift from said neutral gear to said drive gear; and increasing an output torque of the engine in response to said impending shift signal.

3. The method of claim 1 further comprising shifting the transmission from the neutral gear to the drive gear upon expiration of a fail-safe timer if the engine idle speed is not reduced by said predetermined RPM within a predetermined time after detecting said change in said signal.

4. The method of claim 1 wherein said step of reducing an engine idle speed is accomplished by controlling a combustion air flow into the engine.

5. A vehicle powertrain system comprising:
   a PCM having an engine segment and a transmission segment;
   a communications block for communication between said engine segment and said transmission segment;
   an engine having an idle speed controlled by said engine segment;
   a transmission coupled to said engine, said transmission having a drive gear and a neutral gear selected by said transmission segment;

a drive/neutral signal for indicating a desired transmission gear to said transmission segment; wherein said engine segment reduces said idle speed by a predetermined RPM upon said drive/neutral signal indicating a desired transmission gear change from said neutral gear to said drive gear, and said transmission segment changes said transmission gear from said neutral gear to said drive gear after said engine segment reduces said idle speed by the predetermined RPM; and further comprising an exhaust catalyst connected to said engine, said predetermined RPM determined by subtracting a typical idle speed from an increased idle speed, the increased idle speed necessary to increase a rate of heat accumulation in an exhaust catalyst when the engine is started in a cold condition.

6. The vehicle powertrain system of claim 5 further comprising an idle air control valve controlled by said engine segment, said reduction in idle speed being effected at least in part by controlling said idle air control valve.

7. The vehicle powertrain of claim 5 further comprising a fail-safe timer initiated upon said drive/neutral signal indicating a desired transmission gear change;

said transmission segment changing said transmission gear from said neutral gear to said drive gear upon the earlier of expiration of said fall-safe timer and said idle speed being reduced by said predetermined RPM.

8. The vehicle powertrain of claim 5 further comprising an impending shift signal indicative of an imminent transmission shift from said neutral gear to said drive gear; said engine segment increasing an output torque of the engine in response to said impending shift signal.

* * * * *